US009528673B2

(12) United States Patent
Nakada

(10) Patent No.: US 9,528,673 B2
(45) Date of Patent: Dec. 27, 2016

(54) VEHICLE LAMP

(71) Applicant: KOITO MANUFACTURING CO., LTD., Tokyo (JP)

(72) Inventor: Yusuke Nakada, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 174 days.

(21) Appl. No.: 14/220,374

(22) Filed: Mar. 20, 2014

(65) Prior Publication Data

US 2014/0293634 A1 Oct. 2, 2014

(30) Foreign Application Priority Data

Apr. 1, 2013 (JP) ................................ 2013-075634

(51) Int. Cl.

| | |
|---|---|
| ***F21V 7/00*** | (2006.01) |
| ***B60Q 1/00*** | (2006.01) |
| ***B60Q 3/00*** | (2006.01) |
| ***F21S 8/10*** | (2006.01) |

(52) U.S. Cl.

CPC ........ *F21S 48/1159* (2013.01); *F21S 48/1388* (2013.01); *F21S 48/145* (2013.01)

(58) Field of Classification Search

CPC .... F21S 48/1159; F21S 48/13; F21S 48/1317; F21S 48/1388

See application file for complete search history.

(56) References Cited

U.S. PATENT DOCUMENTS

| | | | | |
|---|---|---|---|---|
| 6,882,110 B2 * | 4/2005 | Ishida | B60Q 1/04 | 315/82 |
| 7,607,811 B2 * | 10/2009 | Okada | F21S 48/1154 | 362/538 |
| 8,651,717 B2 * | 2/2014 | Naganawa | F21S 48/1159 | 362/296.07 |
| 2003/0202359 A1 * | 10/2003 | Albou | F21S 48/1159 | 362/514 |
| 2005/0068787 A1 * | 3/2005 | Ishida | B60Q 1/14 | 362/538 |
| 2005/0122736 A1 * | 6/2005 | Watanabe | B60Q 1/06 | 362/542 |

(Continued)

FOREIGN PATENT DOCUMENTS

JP 2008243433 10/2008

*Primary Examiner* — Jong-Suk (James) Lee
*Assistant Examiner* — Erin Kryukova
(74) *Attorney, Agent, or Firm* — Abelman, Frayne & Schwab

(57) ABSTRACT

Disclosed is a projector-type vehicle lamp. The vehicle lamp includes a mirror member which has an upward reflecting surface that upwardly reflects a part of the light reflected from a reflector. A front edge of the upward reflecting surface passes through a rear focus F of a projection lens. A central portion of a front edge of the upward reflecting surface is formed to extend along a meridional image surface of the projection lens, and left and right end portions of the front edge are formed to be displaced forward from the meridional image surface. Accordingly, a central portion of a cut-off line of a low-beam light distribution pattern is formed to be clear and left and right end portions of the cut-off line become blurred such that light may be irradiated to a space in the upper vicinity of the left end portion and/or the right end portion.

11 Claims, 9 Drawing Sheets

(56) References Cited

U.S. PATENT DOCUMENTS

| | | | | | |
|---|---|---|---|---|---|
| 2005/0180156 | A1* | 8/2005 | Iwasaki | F21S 48/1159 | 362/538 |
| 2005/0259431 | A1* | 11/2005 | Iwasaki | F21S 48/1159 | 362/514 |
| 2006/0098450 | A1* | 5/2006 | Iwasaki | F21S 48/1159 | 362/545 |
| 2007/0070638 | A1* | 3/2007 | Fukawa | F21S 48/1159 | 362/475 |
| 2008/0025036 | A1* | 1/2008 | Takada | B60Q 1/12 | 362/523 |
| 2008/0062709 | A1* | 3/2008 | Mochizuki | B60Q 1/0041 | 362/539 |
| 2009/0103323 | A1* | 4/2009 | Ishida | F21S 48/1159 | 362/538 |
| 2010/0110715 | A1* | 5/2010 | Nakada | F21S 48/1159 | 362/538 |
| 2010/0309678 | A1* | 12/2010 | Yamagata | F21S 48/1159 | 362/539 |
| 2010/0309680 | A1* | 12/2010 | Akutagawa | F21S 48/1159 | 362/539 |
| 2011/0141742 | A1* | 6/2011 | Tanaka | F21S 48/1159 | 362/294 |
| 2011/0280029 | A1* | 11/2011 | Yamamoto | F21S 48/1159 | 362/516 |
| 2012/0300485 | A1* | 11/2012 | Lee | B60Q 1/143 | 362/514 |
| 2013/0033864 | A1* | 2/2013 | Spinger | F21S 48/1104 | 362/235 |
| 2013/0051054 | A1* | 2/2013 | Yamagata | F21S 48/145 | 362/518 |
| 2014/0226355 | A1* | 8/2014 | Blandin | F21S 48/1109 | 362/520 |

* cited by examiner

VEHICLE LAMP

CROSS-REFERENCE TO RELATED APPLICATIONS

This application is based on and claims priority from Japanese Patent Application No. 2013-075634, filed on Apr. 1, 2013, with the Japan Patent Office, the disclosure of which is incorporated herein in its entirety by reference.

TECHNICAL FIELD

The present disclosure relates to a projector-type vehicle lamp, and particularly to a projector-type vehicle lamp provided with a mirror member.

BACKGROUND

In general, a projector-type vehicle lamp is configured to reflect light from a light source disposed at the rear side of a rear focus of a projection lens toward a projection lens by a reflector.

When a light distribution pattern having a cut-off line at the upper end thereof such as, for example, a low-beam light distribution pattern, is formed by the above described vehicle lamp, a configuration provided with a shade for shielding a part of the light reflected from the reflector is frequently employed.

For example, Japanese Patent No. 4754518 discloses a projector-type vehicle lamp employing, for example, a light emitting device as a light source, in which instead of a shade, a mirror member which has an upward reflecting surface for upwardly reflecting a part of light reflected from a reflector is provided, thereby facilitating effective utilization of the light from the light source.

SUMMARY

In the projector-type vehicle lamp provided with the mirror member, the upward reflecting surface of the mirror member has a front edge which is formed to pass through a rear focus of a projection lens or the vicinity thereof. Here, when the front edge is formed to extend along a meridional image surface of the projection lens, a cut-off line may be clearly formed. This may eliminate the possibility of giving a glare to a driver of an oncoming vehicle or a preceding vehicle.

However, there is a problem in that when the cut-off line is too clear, it becomes difficult to visibly recognize, for example, a pedestrian present at the roadside.

The present disclosure has been made in consideration of these problems, and an object of the present disclosure is to provide a projector-type vehicle lamp which may enhance visibility of, for example, a pedestrian at the roadside without giving a glare to a driver of an oncoming vehicle or a preceding vehicle.

In the present disclosure, the above described object may be achieved by devising the configuration of a mirror member.

A vehicle lamp according to the present disclosure includes: a projection lens; a light source disposed at a rear side of a rear focus of the projection lens; a reflector configured to reflect light from the light source toward the projection lens; and a mirror member which has an upward reflecting surface configured to upwardly reflect a part of the light reflected from the reflector and is disposed such that a front edge of the upward reflecting surface passes through the rear focus or a vicinity thereof. A central portion of the front edge of the upward reflecting surface is formed to extend along a meridional image surface of the projection lens, and a left end portion and/or a right end portion of the front edge are/is formed to be displaced forward or backward with respect to the meridional image surface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 2A and 2B are plan views illustrating the vehicle lamp in which FIG. 2A illustrates a case that each of a left end portion and a right end portion of the front edge is formed to be displaced forward with respect to the meridional image surface; and FIG. 2B illustrates a case that only one of the left end portion and the right end portion of the front ewe is displaced forward with respect to the meridional image surface.

DETAILED DESCRIPTION

Figure 1:
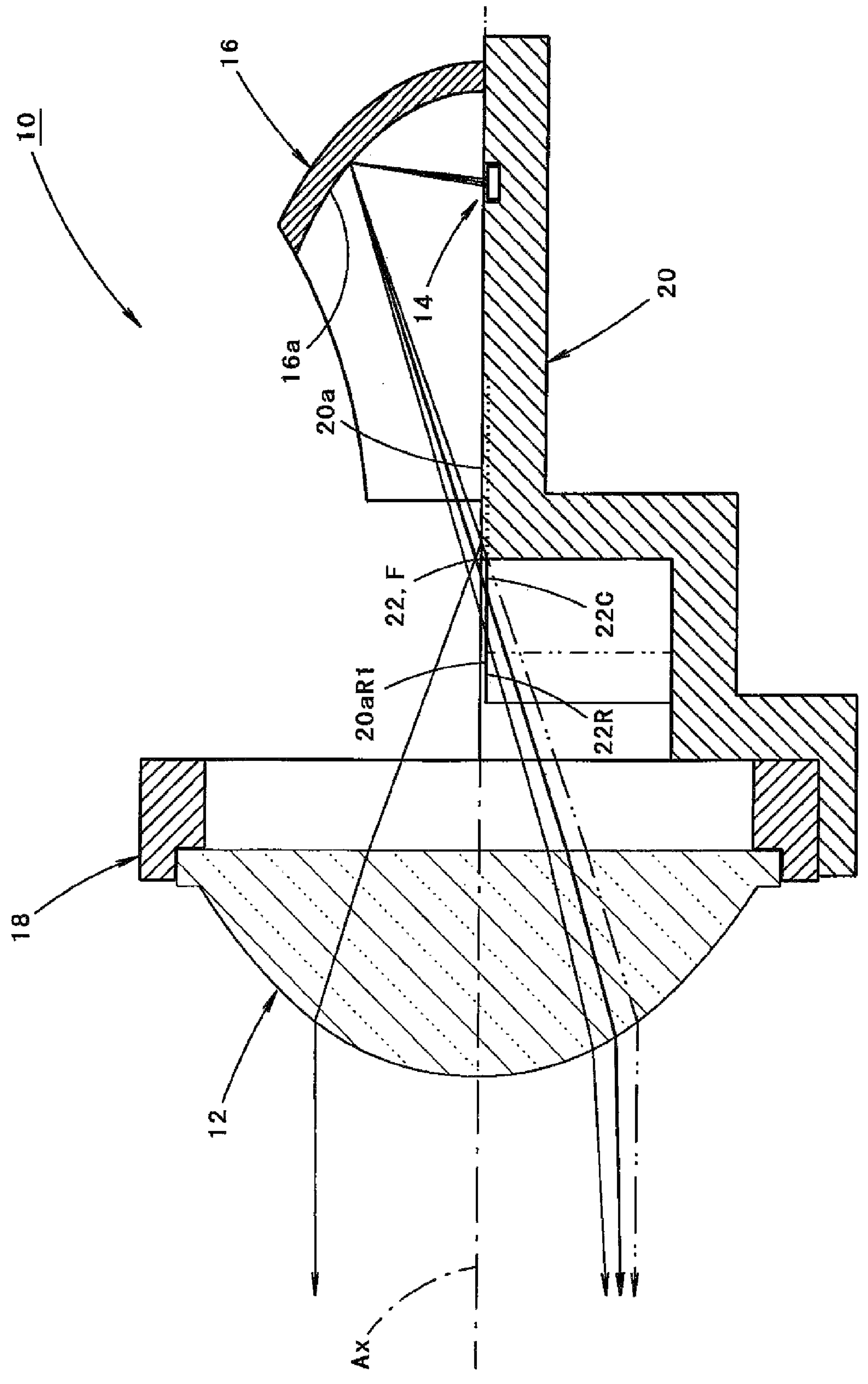
FIG. 1 is a side cross-sectional view illustrating a vehicle lamp according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The kind of “the light source” is not particularly limited. Also, as long as “the light source” is disposed at the rear side of the rear focus of the projection lens, for example, a specific position or direction of the light source is not particularly limited.

As long as “the front edge of the upward reflecting surface” in “the mirror member” is disposed to pass through the rear focus of the projection lens or the vicinity thereof, for example, a specific formation range or surface shape of “the upward reflecting surface” is not particularly limited.

There is no specific limitation in specific boundary positions of the “the central portion” and “the left end portion and/or the right end portion” in “the front edge of the upward reflecting surface”.

According to the above described configuration, the vehicle lamp according to the present disclosure is configured as a projector-type lamp provided with a mirror member. In the mirror member, the central portion of the front edge of the upward reflecting surface is formed to extend along the meridional image surface of the projection lens, and the left end portion and/or the right end portion of the front edge are/is formed to be displaced forward or backward from the meridional image surface. Thus, it is possible to obtain the following acting effects.

That is, since the central portion of the front edge of the upward reflecting surface is formed to extend along the meridional image surface, left and right side central portions on the cut-off line are clearly formed. This may eliminate the possibility of giving a glare to a driver of an oncoming vehicle or a preceding vehicle.

Meanwhile, since the left end portion and/or the right end portion of the front edge of the upward reflecting surface are/is formed to be displaced forward or backward from the meridional image surface, a left end portion and/or a right end portion of the cut-off line become(s) blurred, and thus light may be also irradiated to a space in the upper vicinity of the left end portion and/or the right end portion of the cut-off line. This may allow, for example, a pedestrian present at the roadside to be easily visually recognized.

Here, in the projector-type lamp provided with the mirror member, the region in the lower vicinity of the cut-off line in the light distribution pattern is formed by light that passes through the region in the upper vicinity of the front edge of the upward reflecting surface, and light upwardly reflected from the region in the vicinity of the front edge of the upward reflecting surface.

Accordingly, when the left end portion and/or the right end portion at the front edge of the upward reflecting surface are/is displaced forward with respect to the meridional image surface, the light which passes through the region in the upper vicinity of the front edge of the upward reflecting surface to form the region(s) in the lower vicinity of the left end portion and/or the right end portion of the cut-off line is reduced. Thus, at the left end portion and/or the right end portion of the cut-off line, a contrast in brightness between the upper and lower sides of the cut-off line is greatly reduced. This may allow, for example, a pedestrian present at the roadside to be more easily visually recognized.

Meanwhile, when the left end portion and/or the right end portion at the front edge of the upward reflecting surface of the mirror member are/is displaced backward with respect to the meridional image surface, the light which is upwardly reflected from the region in the vicinity of the front edge of the upward reflecting surface of the mirror member to form the region(s) in the lower vicinity of the left end portion and/or the right end portion of the cut-off line is reduced. Thus, in the left end portion and/or the right end portion of the cut-off line, a contrast in brightness between the upper and lower sides of the cut-off line is greatly reduced. This may allow, for example, a pedestrian present at the roadside to be more easily visually recognized.

As described above, according to the present disclosure, in a projector-type vehicle lamp, it is possible to enhance visibility of, for example, a pedestrian at the roadside without giving a glare to a driver of an oncoming vehicle or a preceding vehicle.

In the above described configuration, when the left end portion and/or the right end portion of the front edge of the upward reflecting surface are/is displaced forward with respect to the meridional image surface, the following acting effects may be obtained.

That is, as described above, when the left end portion and/or the right end portion of the front edge of the upward reflecting surface are/is displaced forward with respect to the meridional image surface, the light to be irradiated to the space in the upper vicinity of the cut-off line is obtained by light which reflects from the upward reflecting surface and then enters the projection lens. Thus, the irradiation light may be easily suppressed from being too bright, as compared to a case where the space in the upper vicinity of the cut-off line is irradiated with light which directly enters the projection lens.

Here, when a portion of the upward reflecting surface which is located at a more front side than the meridional image surface is formed to extend obliquely downward and forward, it is possible to easily allow the light upwardly reflected from the portion to enter the projection lens.

In the above described configuration where each of the left end portion and right end portion of the front edge of the upward reflecting surface in the mirror member is formed to be displaced forward or backward with respect to the meridional image surface, when any one of the left end portion and the right end portion of the front edge, which is located at the own vehicle lane side (that is, a portion which forms the opposite lane side end portion on the cut-off line), is set to have a larger forward or backward displacement amount with respect to the meridional image surface as compared to the other end portion located at the opposite lane side (that is, a portion which forms the own vehicle lane side end portion on the cut-off line), the following acting effect may be obtained.

That is, since the cut-off line of the low-beam light distribution pattern at the opposite lane side is generally located at a lower position than the cut-off line at the own vehicle lane side, in order to easily visually recognize, for example, a pedestrian present at the roadside at the opposite lane side, it is required to irradiate light to a position upwardly farther away from the cut-off line. Accordingly, when the forward or backward displacement amount of the end portion located at the own vehicle lane side is set as a relatively large value so that the light is irradiated to the position upwardly farther away from the cut-off line at the opposite lane side end portion of the cut-off line, it is possible to easily secure a sufficient light required to visually recognize, for example, a pedestrian present at the roadside at both the own vehicle lane side and the opposite lane side.

In the above described configuration, when the forward or backward displacement amount of the left end portion and/or the right end portion of the front edge of the upward reflecting surface with respect to the meridional image surface are/is set to be increased as a distance from the central portion of the front edge is increased leftward/rightward, it is possible to irradiate the light to the position upwardly farther away from the cut-off line according to an increase of the left and right opening angles from the front side direction of the vehicle. This may eliminate the possibility of giving a glare to a driver of an oncoming vehicle or a preceding vehicle, and further it is possible to more easily enhance visibility of, for example, a pedestrian present at the roadside.

Hereinafter, an exemplary embodiment of the present disclosure will be described with reference to drawings.

Figure 2A:
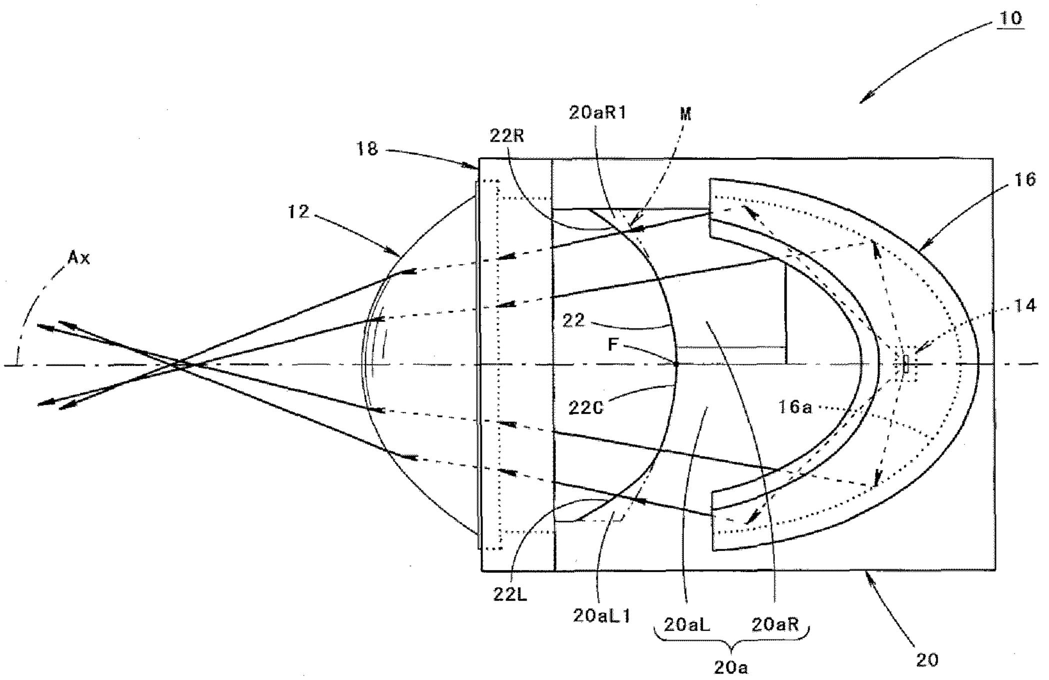
Figure 2B:
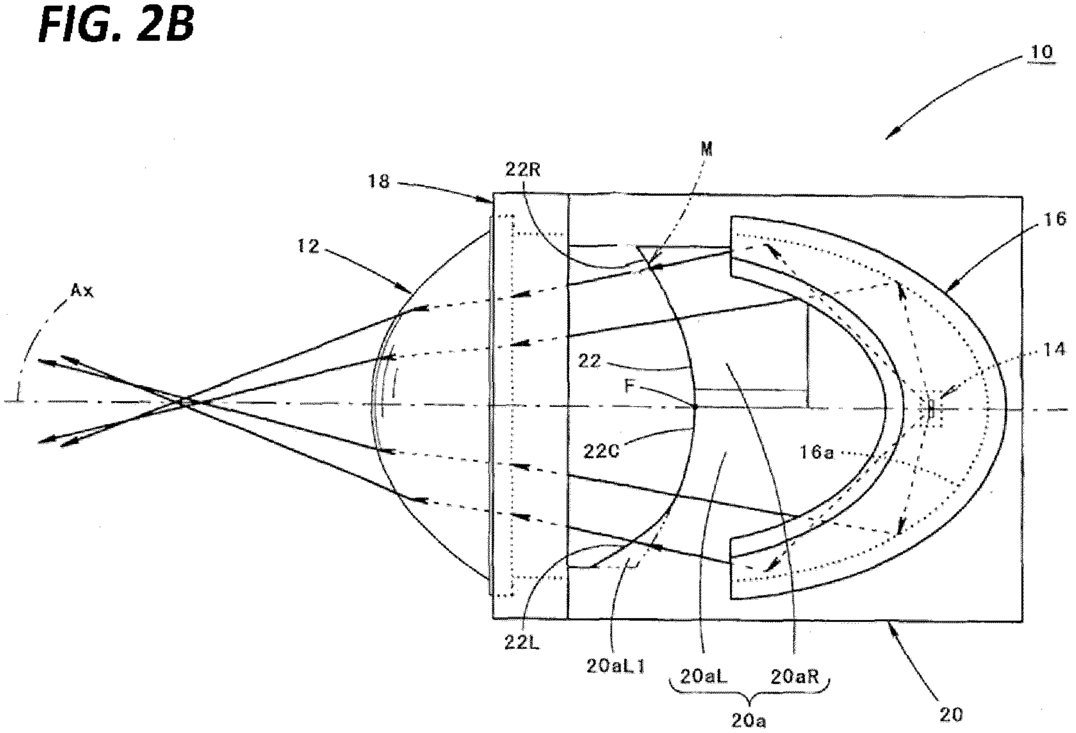
Figure 3:
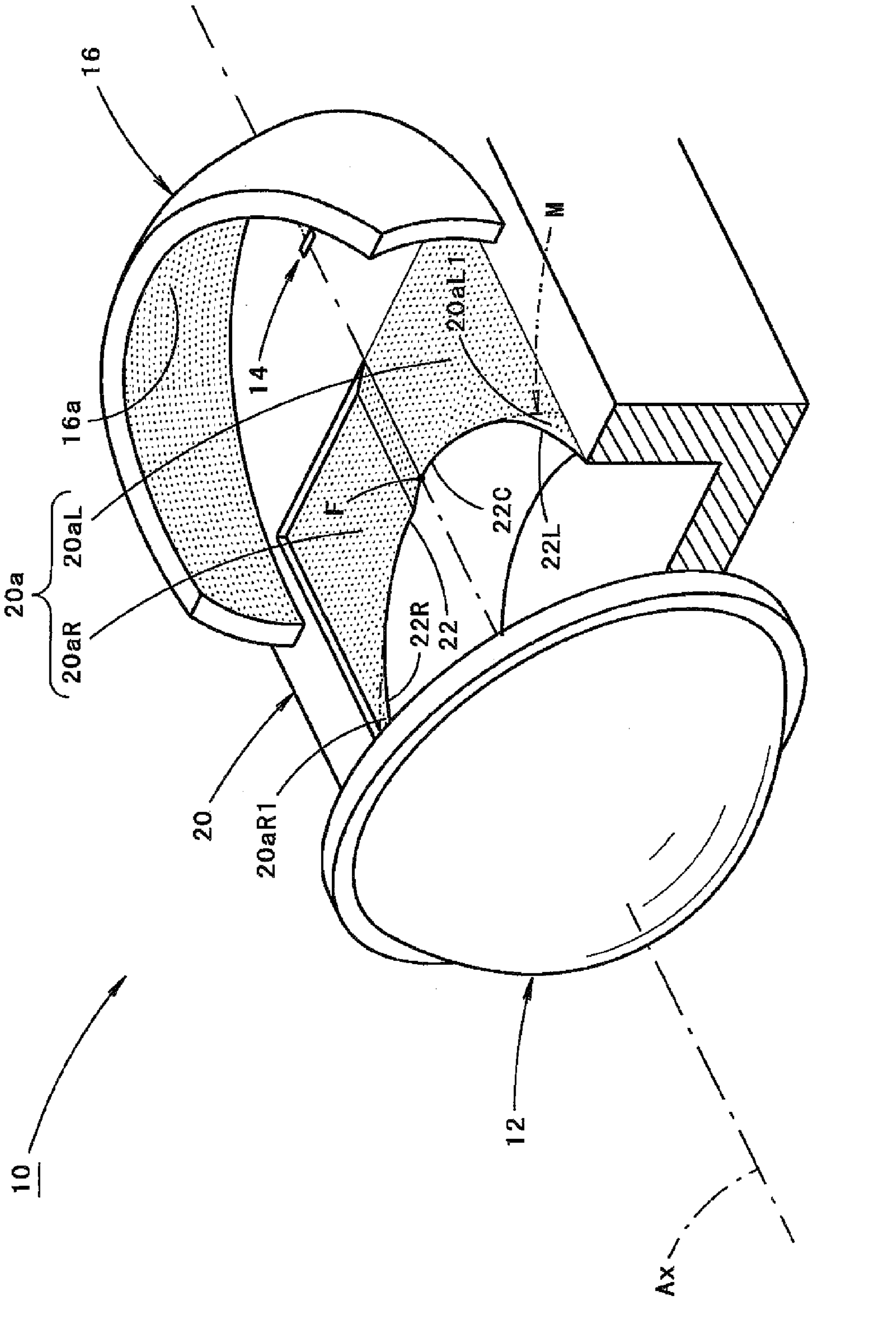
FIG. 3 is a perspective view illustrating main components of the vehicle lamp.

FIG. 1 is a side cross-sectional view illustrating a vehicle lamp 10 according to an exemplary embodiment of the present disclosure, and FIGS. 2A and 2B are plan views of the vehicle lamp 10. FIG. 3 is a perspective view illustrating main components of the vehicle lamp 10.

As illustrated in these drawings, the vehicle lamp 10 according to the present exemplary embodiment includes: a projection lens 12; a light source 14 disposed at the rear side of a rear focus F of the projection lens 12; a reflector 16 disposed to cover the light source 14 from the upper side, and configured to reflect light from the light source 14 toward the projection lens 12; and a mirror member 20 which has an upward reflecting surface 20*a* configured to upwardly reflect a part of the light reflected from the reflector 16.

The light source 14 and the reflector 16 are supported by the mirror member 20, and the projection lens 12 is supported by the mirror member 20 through a lens holder 18.

The vehicle lamp 10 is a lamp unit which is embedded as a part of a head lamp when used. In a state where the vehicle lamp 10 is inserted into the head lamp, the optical axis Ax of the projection lens 12 extends in a direction inclined downward by about 0.5° to 0.6° with respect to the longitudinal direction of the vehicle.

The light source 14 is a light emitting chip of a white light emitting diode, and has a laterally long rectangular light emitting surface. The light source 14 is disposed on the optical axis Ax such that the light emitting surface faces upward.

A reflecting surface 16*a* of the reflector 16 is formed in a substantially ellipsoidal curved surface which has a major axis coaxial with the optical axis Ax, and a first focus at the center of emission of the light source 14. Here, the reflecting surface 16*a* is set such that its vertical cross-sectional shape along the optical axis Ax has an elliptical shape of which a second focus is a point located slightly ahead of the rear focus F, and the eccentricity gradually increases from the vertical cross section toward the horizontal cross section. Accordingly, the reflector 16 causes light from the light source 14 to converge to the point located slightly ahead of the rear focus F in the vertical cross section, and moves the convergence position significantly forward in the horizontal cross section.

The upward reflecting surface 20*a* of the mirror member 20 is formed on the top surface of the mirror member 20 by mirror surface treatment using, for example, aluminum vapor deposition. The upward reflecting surface 20*a* has a left region 20*a*L which is positioned at the left side of the optical axis Ax (right side from the front view of the lamp) and is configured as a horizontal plane including the optical axis Ax, and a right region 20*a*R which is positioned at the right side of the optical axis Ax and is configured as a horizontal plane which is lower than the left region 20*a*L by one step through a short inclined surface. The upward reflecting surface 20*a* of the mirror member 20 is disposed such that its front edge 22 passes through the rear focus F.

Accordingly, as illustrated in FIG. 1, the mirror member 20 is configured such that a part of the reflected light directed from the reflecting surface 16*a* of the reflector 16 to the projection lens 12 is reflected upward by the upward reflecting surface 20*a* to enter the projection lens 12 and then to be emitted from the projection lens 12 as downward light. The light emitted from the projection lens 12 forms a low-beam light distribution pattern (to be described later) of left light distribution.

As indicated by hatching of broken lines in FIG. 3, the upward reflecting surface 20*a* is formed in a region ranging from the front edge 22 to a position spaced away from the front edge 22 backward by a predetermined distance.

As illustrated in FIG. 2A, the front edge 22 of the upward reflecting surface 20*a* in the mirror member 20 has a central portion 22C which is formed to extend along a meridional image surface (the cross-sectional shape is indicated by two-dot chain line in the drawing) M of the projection lens 12, and a left end portion 22L and a right end portion 22R each of which is formed to be displaced forward with respect to the meridional image surface M.

Figure 4:
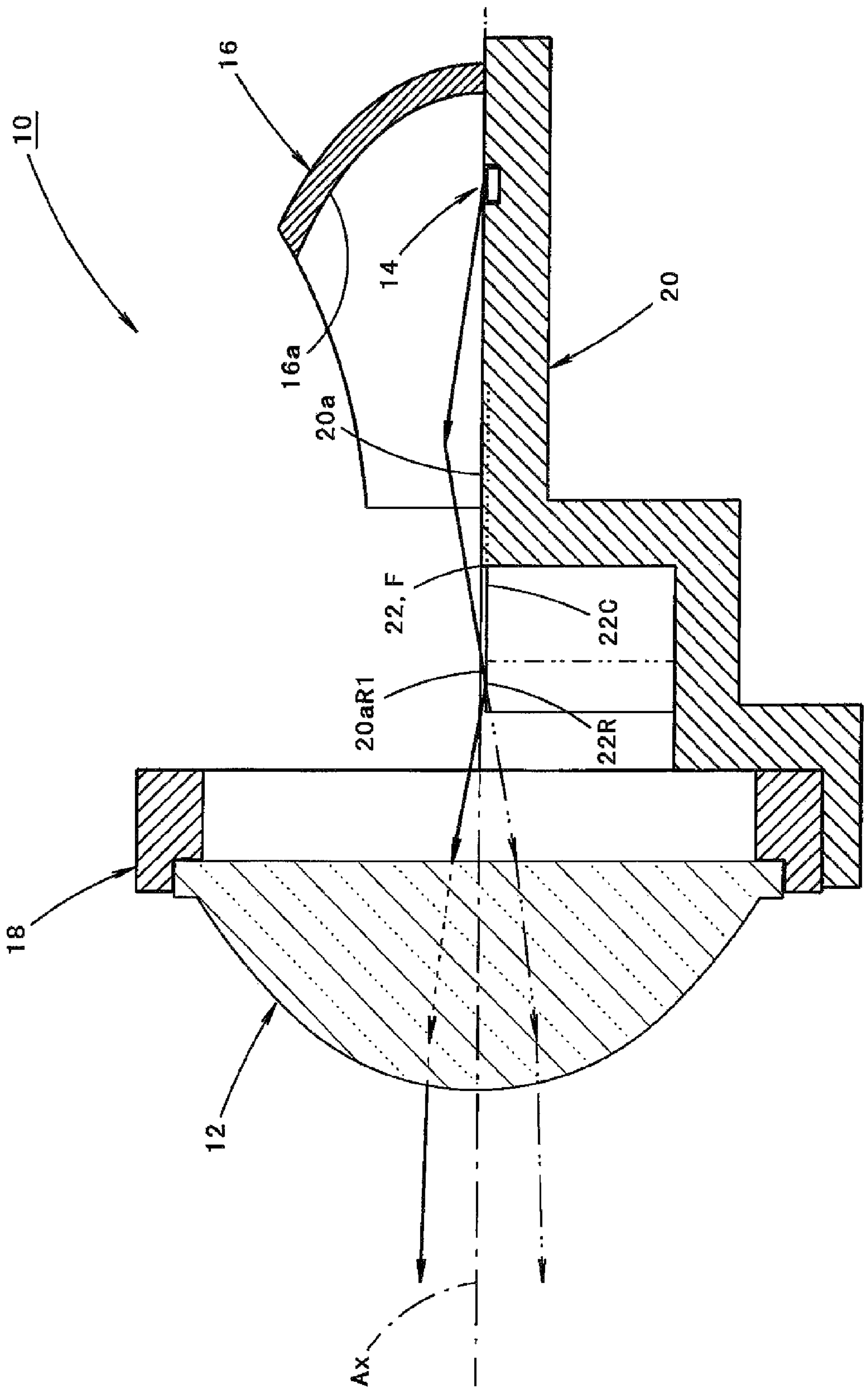
FIG. 4 is a side cross-sectional view illustrating the operation of the exemplary embodiment.

As illustrated in FIGS. 2A and 4, on the upward reflecting surface 20*a* of the mirror member 20, the reflected light from the reflector 16 which is upwardly reflected from a right front edge region 20*a*R1 located at a more front side than the meridional image surface M (that is, a region located in the rear vicinity of the right end portion 22R of the front edge 22) enters the projection lens 12, and is emitted as upward light from the projection lens 12.

Likewise, on the upward reflecting surface 20*a* of the mirror member 20, the reflected light from the reflector 16 which is upwardly reflected from a left front edge region 20*a*L1 located at a more front side than the meridional image surface M (that is, a region located in the rear vicinity of the left end portion 22L of the front edge 22) enters the projection lens 12, and is emitted as upward light from the projection lens 12.

Here, the forward displacement amount of each of the left end portion 22L and the right end portion 22R from the meridional image surface M is set to be gradually increased as a distance from the central portion 22C of the front edge 22 is increased leftward and rightward.

The forward displacement amount from the meridional image surface M at the left end portion (that is, the end portion located at the own vehicle lane side) 22L of the front edge 22 is set as a larger value than the amount at the right end portion (that is, the end portion located at the opposite lane side) 22R.

Figure 5A:
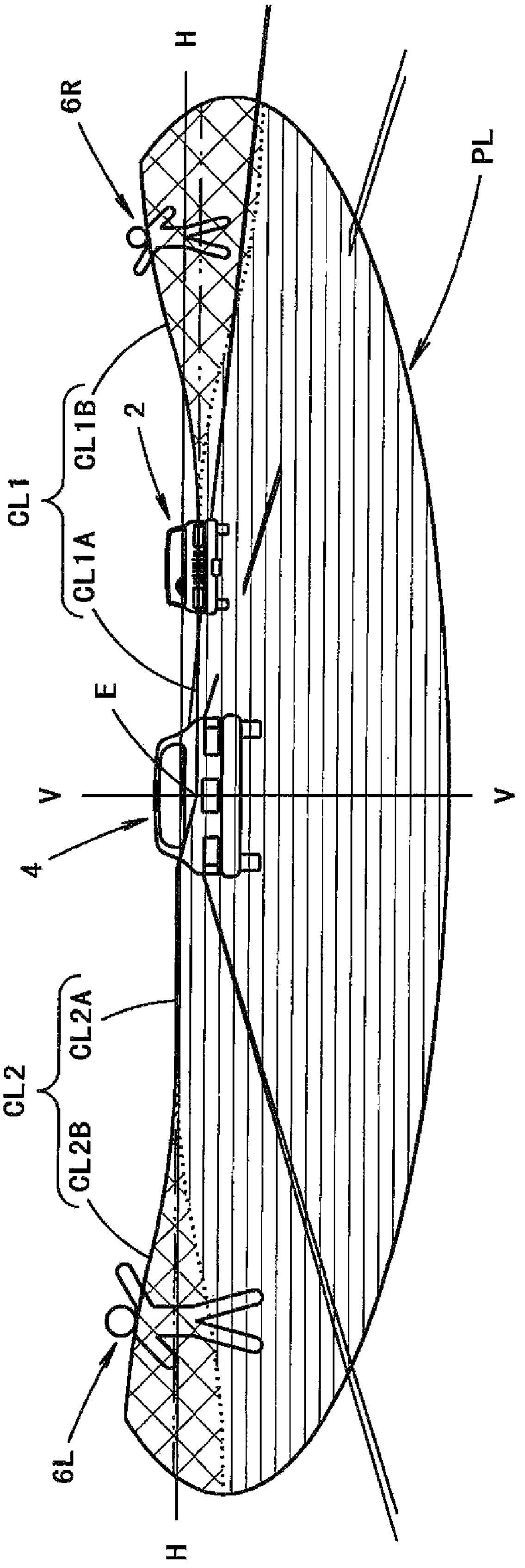
FIG. 5A is a view perspectively illustrating a low-beam light distribution pattern formed on a virtual vertical screen disposed at a position 25 m ahead of a vehicle by light irradiated forward from the vehicle lamp.

FIG. 5A is a view perspectively illustrating a low-beam light distribution pattern PL formed on a virtual vertical screen disposed at a position 25 m ahead of a vehicle by light irradiated forward from the vehicle lamp 10.

The low-beam light distribution pattern PL is a low-beam light distribution pattern of left light distribution, and has left and right cut-off lines CL1 and CL2 with a stepped difference at the upper edges thereof. The cut-off lines CL1 and CL2 extend in a horizontal direction with a stepped difference between the left and right sides of the V-V line that vertically passes through H-V as a vanishing point in the front direction of the lamp. The opposite lane side portion at the right side of the V-V line is formed as a lower cut-off line CL1, and the own vehicle lane side portion at the left side of the V-V line is formed as an upper cut-off line CL2 stepped up from the lower cut-off line CL1 with an inclined portion interposed therebetween.

The low-beam light distribution pattern PL is formed by projecting the image of the light source 14 on the virtual vertical screen as a reversed projection image by the projection lens 12, in which the image of the light source 14 is formed on a rear focus plane of the projection lens 12 by the light which is emitted from the light source 14 and reflected by the reflector 16. The cut-off lines CL1 and CL2 are formed as a reversed projection image of the front edge 22 of the upward reflecting surface 20*a* of the mirror member 20. Here, the lower cut-off line CL1 is formed as a reversed projection image of the portion of the left region 20*a*L at the front edge 22, and the upper cut-off line CL2 is formed as a reversed projection image of the portion of the right region 20*a*R at the front edge 22.

In the low-beam light distribution pattern PL, an elbow point E as an intersection of the lower cut-off line CL1 and the V-V line is positioned about 0.5° to 0.6° below H-V. This is because the optical axis Ax extends in a direction inclined downward by about 0.5° to 0.6° with respect to the longitudinal direction of the vehicle.

The lower cut-off line CL1 is formed as a distinct cut-off line CL1A which extends horizontally in an angle range up to 20° at the right side from the V-V line, but is formed as an ambiguous cut-off line CL1B which is displaced upward from the cut-off line CL1A in an angle range exceeding 20° at the right side.

This is because the left end portion 22L of the front edge 22 on the upward reflecting surface 20*a* of the mirror member 20 is displaced forward with respect to the meridional image surface M, and the reflected light from the reflector 16 which is upwardly reflected from the left front edge region 20*a*L1 of the upward reflecting surface 20*a* is emitted as upward light from the projection lens 12.

Here, the cut-off line CL1B extends to be obliquely gradually displaced upward from the position of the cut-off line CL1A as the right opening angle from the V-V line is increased. This is because the forward displacement amount of the left end portion 22L of the front edge 22 from the meridional image surface M is set to be gradually increased as a distance from the central portion 22C of the front edge 22 is increased leftward.

The upper cut-off line CL2 is formed as a distinct cut-off line CL2A which horizontally extends in an angle range up to 20° at the left side from the V-V line, but is formed as an ambiguous cut-off line CL2B which is displaced upward from the cut-off line CL2A in an angle range exceeding 20° at the left side.

This is because the right end portion 22R of the front edge 22 on the upward reflecting surface 20*a* of the mirror member 20 is displaced forward with respect to the meridional image surface M, and the reflected light from the reflector 16 which is upwardly reflected from the right front edge region 20*a*R1 of the upward reflecting surface 20*a* is emitted as upward light from the projection lens 12.

Here, the cut-off line CL2B extends to be obliquely gradually displaced upward from the position of the cut-off line CL2A as the left opening angle from the V-V line is increased. This is because the forward displacement amount of the right end portion 22R of the front edge 22 from the meridional image surface M is set to be gradually increased as a distance from the central portion 22C of the front edge 22 is increased rightward.

The upward displacement amount of the cut-off line CL1B from the cut-off line CL1A in the lower cut-off line CL1 is set to be larger than the upward displacement amount of the cut-off line CL2B from the cut-off line CL2A in the upper cut-off line CL2. This is because the forward displacement amount from the meridional image surface M at the left end portion 22L of the front edge 22 is set as a larger value than the amount at the right end portion 22R. Here, the forward displacement amount of each of the left end portion 22L and the right end portion 22R of the front edge 22 from the meridional image surface M is set such that the cut-off line CL1B of the lower cut-off line CL1 and the cut-off line CL2B of the upper cut-off line CL2 have almost the same upward protrusion amount from the H-H line which horizontally passes through H-V.

Figure 5B:
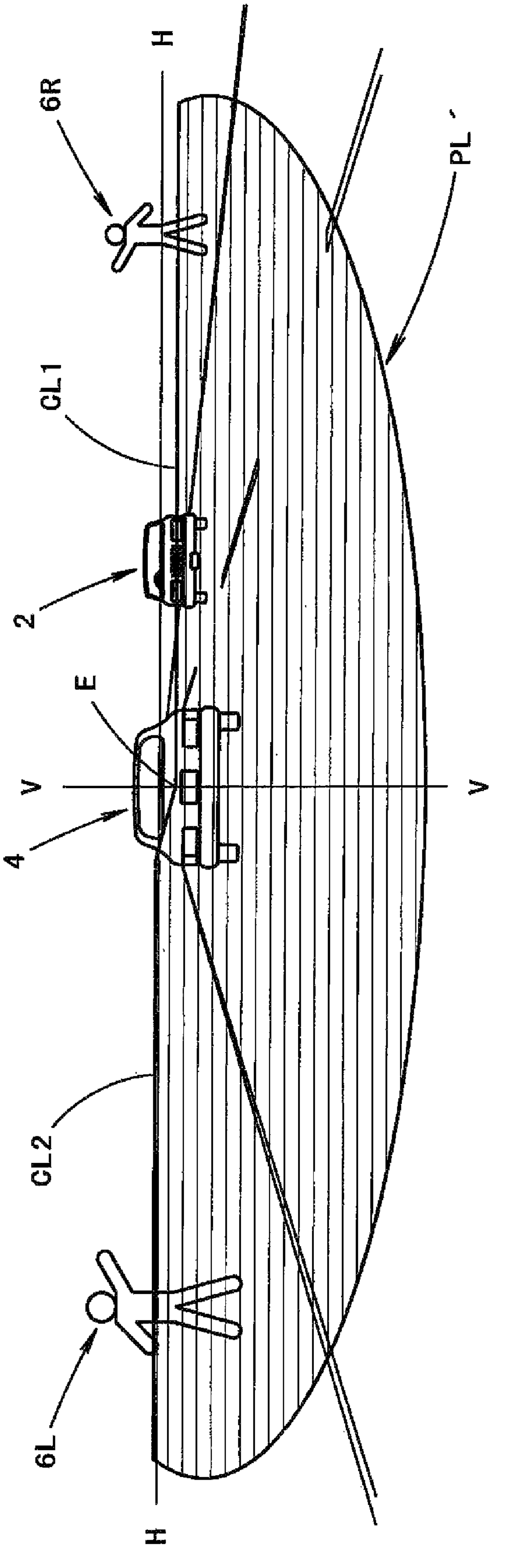
FIG. 5B is a view perspectively illustrating a low-beam light distribution pattern formed on the virtual vertical screen by light irradiated forward from a conventional vehicle lamp.

FIG. 5B is a view perspectively illustrating a low-beam light distribution pattern PL' formed on the virtual vertical screen by light irradiated forward from a conventional vehicle lamp.

Like the low-beam light distribution pattern PL, the low-beam light distribution pattern PL' also has left and right cut-off lines CL1 and CL2 with a stepped difference at the upper edges thereof. However, not only the central portions of the cut-off lines CL1 and CL2 in an angle range up to 20° at both the left and right sides from the V-V line, but also both the left and right end portions of the cut-off lines CL1 and CL2 are formed as distinct cut-off lines which horizontally extend.

Accordingly, although there is no possibility of giving a glare to a driver of an oncoming vehicle 2 or a preceding vehicle 4, light is irradiated only on the lower body portions of pedestrians 6L and 6R present at the roadside.

In contrast, as illustrated in FIG. 5A, in the low-beam light distribution pattern PL, since the left and right central portions of the cut-off lines CL1 and CL2 are clearly formed as the cut-off lines CL1A and CL2A, there is no possibility of giving a glare to a driver of an oncoming vehicle 2 or a preceding vehicle 4. Further, since the left end portion of the upper cut-off line CL2 is formed as the ambiguous cut-off line CL2B displaced upward from the cut-off line CL2A, and the right end portion of the lower cut-off line CL1 is formed as the ambiguous cut-off line CL1B displaced upward from the cut-off line CL1A, light is irradiated to the upper body portions of pedestrians 6L and 6R present at the roadside.

Here, unlike in the low-beam light distribution pattern PL', in the low-beam light distribution pattern PL, the region in the lower vicinity of the left end portion of the upper cut-off line CL2 (the region indicated by the net line in the drawing), including a some region downward below the cut-off line CL2A, becomes partially darker, and the region in the lower vicinity of the right end portion of the lower cut-off line CL1 (the region indicated by the net line in the drawing), including some region downward below the cut-off line CL1A, becomes partially darker.

This is because when the left end portion 22L and the right end portion 22R of the front edge 22 of the upward reflecting surface 20*a* are displaced forward with respect to the meridional image surface M, the light which passes through the region in the upper vicinity of the front edge 22 of the upward reflecting surface 20*a* to form regions in the lower vicinity of the left end portion and the right end portion of the cut-off lines CL1 and CL2 is reduced.

Hereinafter, acting effects of the present exemplary embodiment will be described.

The vehicle lamp 10 according to the present exemplary embodiment is configured as a projector-type lamp provided with a mirror member 20. In the mirror member 20, the central portion 22C of the front edge 22 of the upward reflecting surface 20*a* is formed to extend along the meridional image surface M of the projection lens 12, and both the left end portion 22L and the right end portion 22R of the front edge 22 are formed to be displaced forward from the meridional image surface M. Thus, it is possible to obtain the following acting effects.

That is, since the central portion 22C of the front edge 22 of the upward reflecting surface 20*a* is formed to extend along the meridional image surface M, left and right side central portions (that is, the cut-off lines CL1A and CL2A) on the cut-off lines CL1 and CL2 are clearly formed. This may eliminate the possibility of giving a glare to a driver of an oncoming vehicle 2 or a preceding vehicle 4.

Meanwhile, since the left end portion 22L and the right end portion 22R of the front edge 22 of the upward reflecting surface 20*a* are formed to be displaced forward from the meridional image surface M, the left end portion and the right end portion of the cut-off lines CL1 and CL2 become blurred and thus, light may be also irradiated to a space in the upper vicinity of the left end portion and the right end portion. This may allow, for example, pedestrians 6L and 6R present at the roadside to be easily visually recognized.

Here, since the left end portion 22L and the right end portion 22R of the front edge 22 of the upward reflecting surface 20*a* are displaced forward with respect to the meridional image surface M, the light which passes through the region in the upper vicinity of the front edge 22 of the upward reflecting surface 20*a* to form the regions in the lower vicinity of the left end portion and the right end portion of the cut-off lines CL1 and CL2 is reduced. Thus, at the left end portion and the right end portion of the cut-off lines CL1 and CL2, a contrast in brightness between the upper and lower sides of the cut-off lines CL1 and CL2 is greatly reduced. This may allow, for example, pedestrians 6L and 6R present at the roadside to be more easily visually recognized.

As described above, according to the present exemplary embodiment, in the projector-type vehicle lamp 10, it is possible to enhance visibility of, for example, the pedestrians 6L and 6R at the roadside without giving a glare to a driver of the oncoming vehicle 2 or the preceding vehicle 4.

Particularly, in the present exemplary embodiment, since the left end portion 22L and the right end portion 22R of the front edge 22 of the upward reflecting surface 20*a* are displaced forward with respect to the meridional image surface M, the light to be irradiated to the space in the upper vicinity of the cut-off lines CL1 and CL2 is obtained by a light which reflects from the upward reflecting surface 20*a* and then enters the projection lens 12. Thus, the irradiation light may be easily suppressed from being too bright, as compared to a case where the space in the upper vicinity of the cut-off lines CL1 and CL2 is irradiated with a light which directly enters the projection lens 12.

In the present exemplary embodiment, since the forward displacement amount from the meridional image surface M at the left end portion 22L of the upward reflecting surface 20*a* is set as a larger value than the amount at the right end portion 22R, the following acting effects may be obtained.

That is, since in the low-beam light distribution pattern PL, one of the cut-off lines CL1 and CL2 at the opposite lane side is located at a lower position than the other at the own vehicle lane side, in order to easily visually recognize, for example, a pedestrian 6R present at the roadside at the opposite lane side, it is required to irradiate a light to a position upwardly farther away from the lower cut-off line CL1 at the opposite lane side. Accordingly, as in the present exemplary embodiment, when the forward displacement amount of the left end portion 22L located at the own vehicle lane side is set as a relatively large value so that the cut-off line CL1B (that is, the portion of the lower cut-off line CL1 located at the opposite lane side end portion) is formed at a position upwardly farther away from the cut-off line CL1A, it is possible to easily secure a sufficient light required to visually recognize, for example, pedestrians 6L and 6R present at the roadside at both the own vehicle lane side and the opposite lane side.

In the present exemplary embodiment, since the forward displacement amount of each of the left end portion 22L and the right end portion 22R of the front edge 22 from the meridional image surface M is set to be increased as a distance from the central portion 22C of the front edge 22 is increased leftward or rightward, it is possible to irradiate the light to the position upwardly farther away from the cut-off lines CL1A and CL2A according to an increase of the left and right opening angles from the front side direction of the vehicle. This may eliminate the possibility of giving a glare to a driver of the oncoming vehicle 2 or the preceding vehicle 4, and thus it is possible to more easily enhance visibility of, for example, pedestrians 6L and 6R present at the roadside.

Instead of the above described configuration, the forward displacement amount of each of the left end portion 22L and the right end portion 22R of the front edge 22 from the meridional image surface M may be set as a predetermined value.

In the above described exemplary embodiment, each of the left end portion 22L and the right end portion 22R of the front edge 22 is displaced forward with respect to the meridional image surface M. However, in another configuration illustrated in FIG. 2B, only one of the left end portion 22L and the right end portion 22R, for example, the left end portion 22L may be displaced forward with respect to the meridional image surface M.

In the above described exemplary embodiment, the front edge 22 is disposed to pass through the rear focus F. However, in another configuration, the front edge 22 may be disposed to pass through the vicinity of the rear focus F (for example, the upper or lower vicinity of the rear focus F).

In the above described exemplary embodiment, the vehicle lamp 10 is configured to form the low-beam light distribution pattern PL of left light distribution. However, when the vehicle lamp 10 is configured to form a low-beam light distribution pattern of right light distribution or to form a light distribution pattern that has only a horizontal cut-off line at the upper end thereof, the same acting effects may be obtained by employing the same configuration as in the above described exemplary embodiment.

Hereinafter, modified examples of the above described exemplary embodiment will be described.

First, a first modified example of the above described exemplary embodiment will be described.

Figure 6:
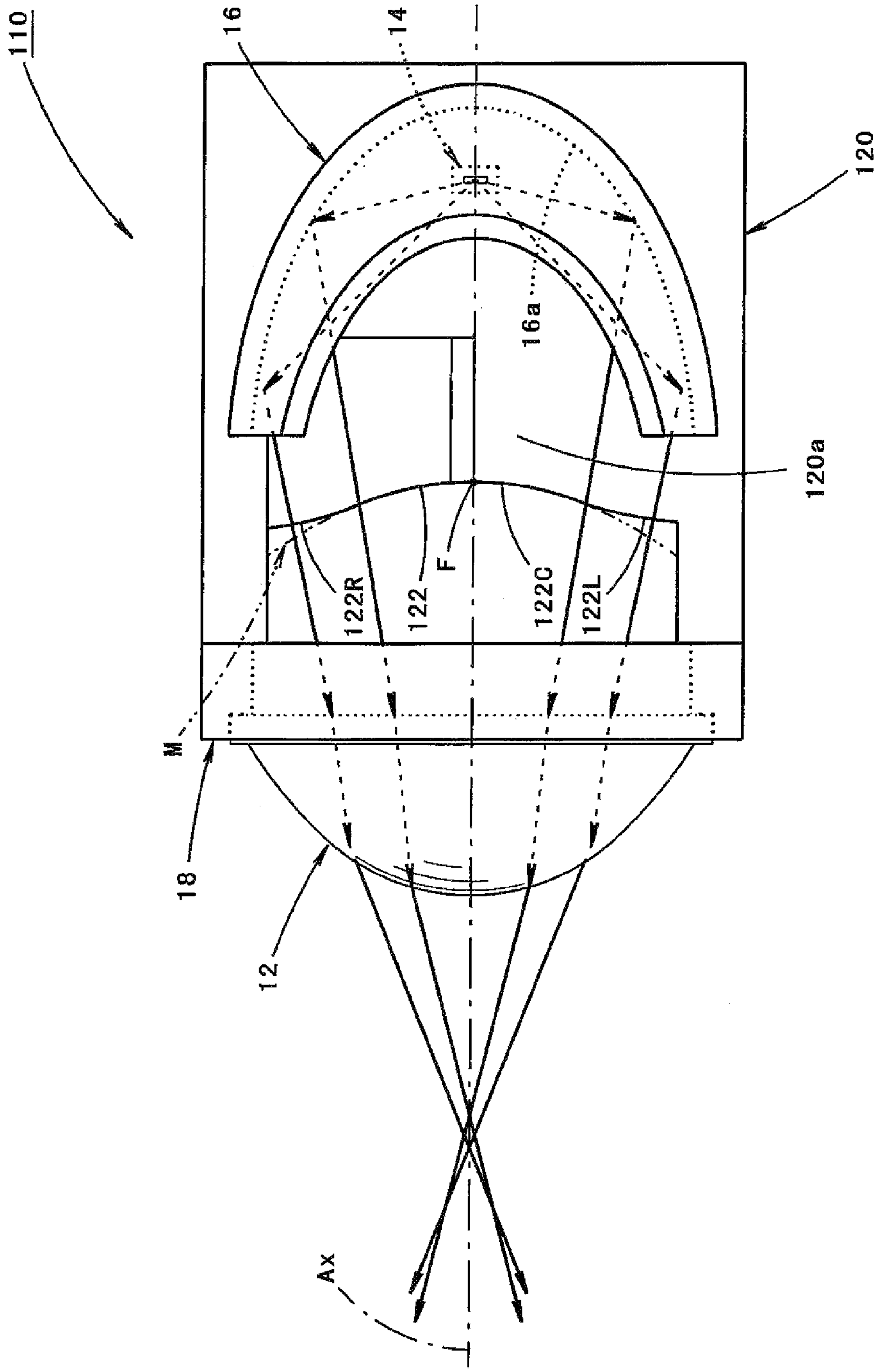
FIG. 6 is a plan view illustrating a first modified example of the exemplary embodiment.
Figure 7:
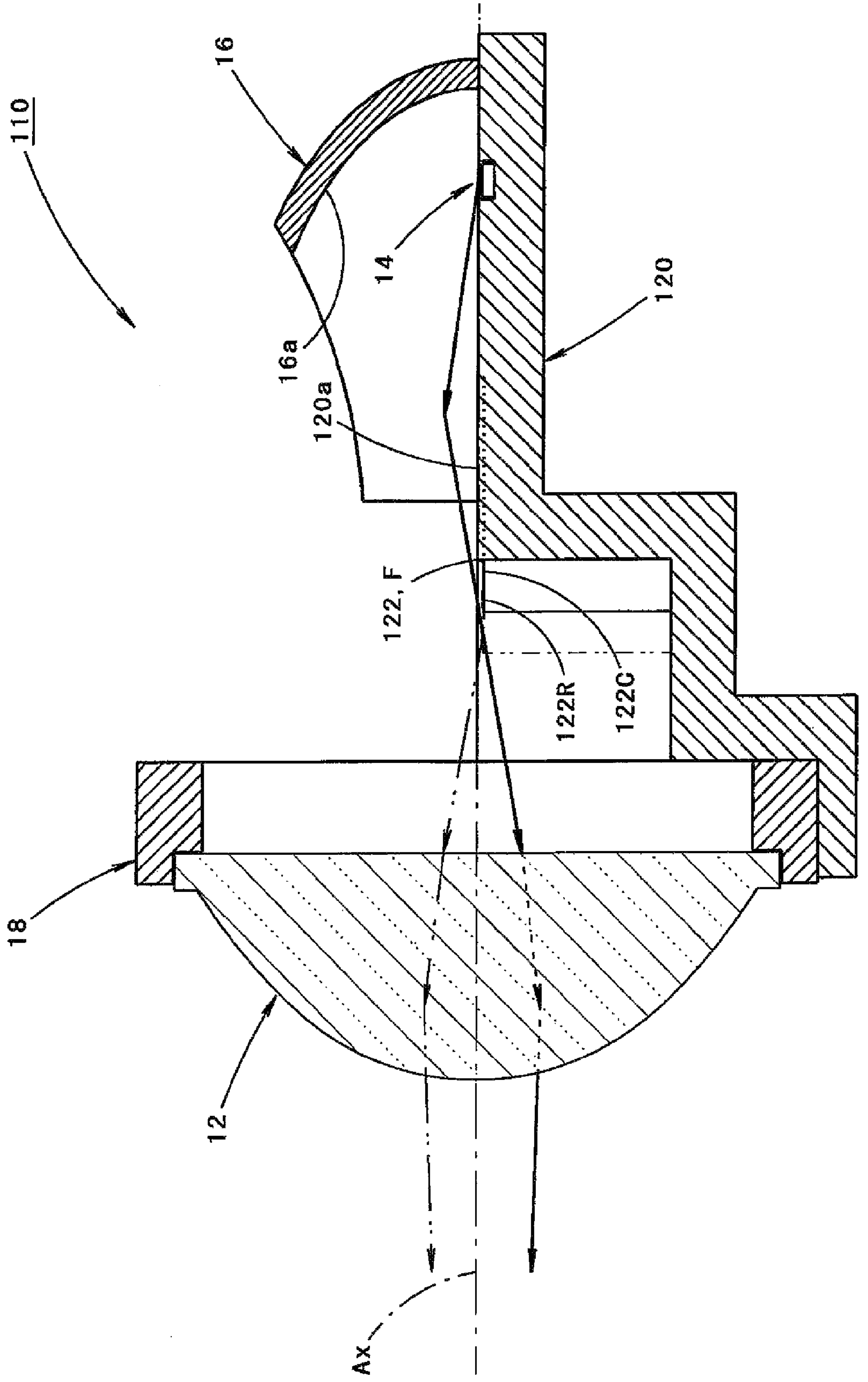
FIG. 7 is a side cross-sectional view illustrating the operation of the first modified example.

FIG. 6 is a plan view illustrating a vehicle lamp 110 according to the present modified example, and FIG. 7 is a side cross-sectional view illustrating the optical operation of a mirror member 120 of the present modified example.

As illustrated in these drawings, the vehicle lamp 110 according to the present modified example has the same basic configuration as the above described exemplary embodiment. However, the configuration of an upward reflecting surface 120*a* of the mirror member 120 is different from that of the above described exemplary embodiment.

That is, on the upward reflecting surface 120*a* in the mirror member 120 of the present modified example, a front edge 122 also has a central portion 122C which is formed to extend along a meridional image surface M of a projection lens 12. However, each of a left end portion 122L and a right end portion 122R of the front edge 122 is formed to be displaced backward with respect to the meridional image surface M.

Accordingly, the reflected light from the reflector 16, which has reached the space between the left end portion 122L and the right end portion 122R of the front edge 122 of the upward reflecting surface 120*a* and the meridional image surface M, enters the projection lens 12, as it is, without being reflected upward, and is emitted from the projection lens 12 as upward light.

Here, the backward displacement amount of each of the left end portion 122L and the right end portion 122R from the meridional image surface M is set to be gradually increased as a distance from the central portion 122C of the front edge 122 is increased leftward or rightward.

The backward displacement amount from the meridional image surface M at the left end portion 122L of the front edge 122 is set as a larger value than the amount at the right end portion 122R.

When the configuration of the present modified example is employed, it is also possible to form the low-beam light distribution pattern which is substantially the same as the low-beam light distribution pattern PL in FIG. 5A. Accordingly, it is possible to enhance visibility of, for example, pedestrians 6L and 6R at the roadside without giving a glare to a driver of an oncoming vehicle 2 or a preceding vehicle 4.

In the present modified example, it is possible to reduce the light which is upwardly reflected from the region in the vicinity of the front edge of the upward reflecting surface 120*a* of the mirror member 120 to form the regions in the lower vicinity of the left end portion and the right end portion of cut-off lines CL1 and CL2. Accordingly, in the modified example, at the left end portion and the right end portion of the cut-off lines CL1 and CL2, a contrast in brightness between the upper and lower sides may also be greatly reduced.

Hereinafter, a second modified example of the above described exemplary embodiment will be described.

Figure 8:
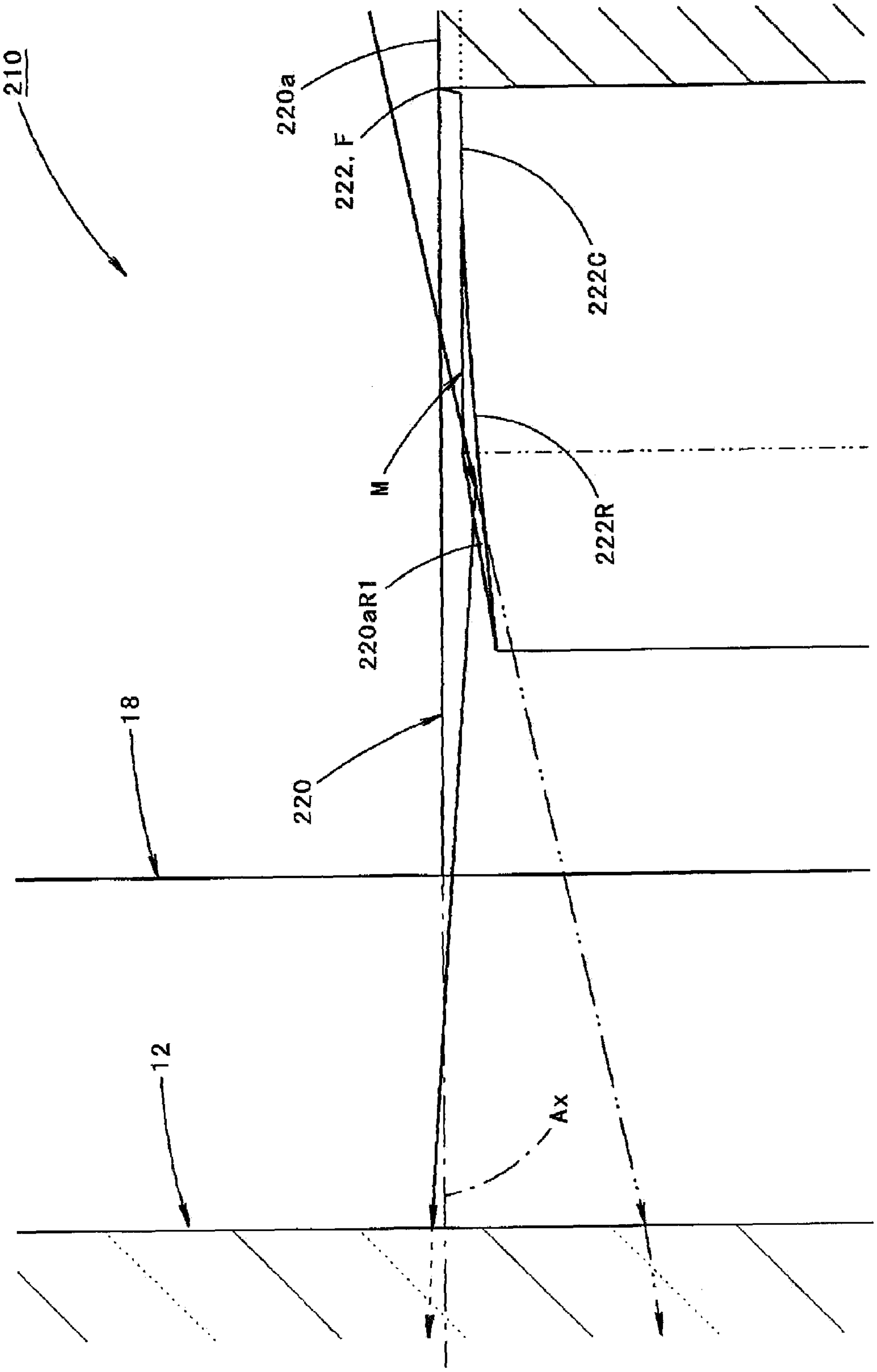
FIG. 8 is a side cross-sectional view illustrating main components of a second modified example of the exemplary embodiment.

FIG. 8 is a side cross-sectional view illustrating main components of a vehicle lamp 210 according to the present modified example.

As illustrated in FIG. 8, the vehicle lamp 210 according to the present modified example has the same basic configuration as the above described exemplary embodiment. However, the configuration of an upward reflecting surface 220*a* of a mirror member 220 is different from that of the above described exemplary embodiment.

That is, on the upward reflecting surface 220*a* in the mirror member 220 of the present modified example, a front edge 222 also has a central portion 222C which is formed to extend along a meridional image surface M of a projection lens 12, and a right end portion 222R which is formed to be displaced forward with respect to the meridional image surface M. However, a right front edge region 220*a*R1 located at a more front side than the meridional image surface M on the upward reflecting surface 220*a* is formed to obliquely extend downward toward the front side.

Likewise, a left end portion (not illustrated) of the front edge 222 of the upward reflecting surface 220*a* is formed to be displaced forward with respect to the meridional image surface M, and a left front edge region (not illustrated) of the upward reflecting surface 220*a* is formed to obliquely extend downward toward the front side.

In the present modified example, the reflected light from the reflector 16 which is upwardly reflected from the right front edge region 220*a*R1 (and the left front edge region) of the upward reflecting surface 220*a* of the mirror member 220 also enters the projection lens 12 and is emitted as upward light from the projection lens 12. However, the upward angle becomes smaller than that of the above described exemplary embodiment.

When the configuration of the present modified example is employed, it is possible to easily allow the light upwardly reflected from the right front edge region 220*a*R1 (and the left front edge region) to enter the projection lens 12.

Of course, the numerical values shown as specifications in the above described exemplary embodiment and the modified examples thereof are merely examples, and may be properly set as different values.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:

a projection lens;

a light source disposed at a rear side of a rear focus of the projection lens;

a reflector configured to reflect light from the light source toward the projection lens; and a mirror member which has an upward reflecting surface configured to upwardly reflect a part of the light reflected from the reflector and is disposed such that a front edge of the upward reflecting surface passes through the rear focus or a vicinity thereof, wherein a central portion of the front edge of the upward reflecting surface is formed to extend along a meridional image surface of the projection lens both at a left side and a right side of an optical axis, each of a left end portion and a right end portion of the front edge is formed to be displaced forward or backward with respect to the meridional image surface, and a low-beam light distribution pattern is formed on a virtual vertical screen disposed at a predetermined distance ahead of a vehicle by light irradiated forward from the vehicle lamp, wherein the low-beam light distribution pattern includes:

a first cut-off line formed at an upper edge thereof in an opposite lane side of an own vehicle lane side; and a second cut-off line formed at the upper edge thereof in the own vehicle lane side, wherein the first cut-off line includes:

a first inner cut-off line extending horizontally in an angle range up to a predetermined degree at a right side from a vertical line passing through a vanishing point in a front direction of the vehicle lamp; and a first outer cut-off line displaced upward from the first inner cut-off line, the second cut-off line includes:

a second inner cut-off line extending horizontally in an angle range up to a predetermined degree at a left side from the vertical line; and a second outer cut-off line displaced upward from the second inner cut-off line, and wherein a forward or backward displacement amount of each of the left end portion and the right end portion of the front edge from the meridional image surface is set such that the first outer cut-off line and the second outer cut-off line have a substantially symmetric upward protrusion amount from a horizontal line passing through the vanishing point.

2. The vehicle lamp of claim 1, wherein only one of the left end portion and the right end portion of the front edge is displaced forward with respect to the meridional image surface.

3. The vehicle lamp of claim 2, wherein a portion of the upward reflecting surface which is located at a more front side than the meridional image surface is formed to be inclined obliquely extend downward toward a front side.

4. The vehicle lamp of claim 1, wherein one of the left end portion and the right end portion of the front edge, which is located at the own vehicle lane side and is set to have a larger forward or backward displacement amount from the meridional image surface as compared to the other end portion located at the opposite lane side.

5. The vehicle lamp of claim 2, wherein one of the left end portion and the right end portion of the front edge, which is located at the own vehicle lane side is set to have a larger forward or backward displacement amount from the meridional image surface as compared to the other end portion located at the opposite lane side.

6. The vehicle lamp of claim 3, wherein one of the left end portion and the right end portion of the front edge, which is located at the own vehicle lane side is set to have a larger forward or backward displacement amount from the meridional image surface as compared to the other end portion located at the opposite lane side.

7. The vehicle lamp of claim 1, wherein a forward or backward displacement amount of each of the left end portion and the right end portion of the front edge from the meridional image surface is set to be increased as a distance from the central portion of the front edge is increased leftward and rightward, respectively.

8. The vehicle lamp of claim 2, wherein a forward or backward displacement amount of each of the left end portion and the right end portion of the front edge from the meridional image surface is set to be increased as a distance from the central portion of the front edge is increased leftward and rightward, respectively.

9. The vehicle lamp of claim 3, wherein a forward or backward displacement amount of each of the left end portion and the right end portion of the front edge from the meridional image surface is set to be increased as a distance from the central portion of the front edge is increased leftward and rightward, respectively.

10. The vehicle lamp of claim 4, wherein a forward or backward displacement amount of each of the left end portion and the right end portion of the front edge from the meridional image surface is set to be increased as a distance from the central portion of the front edge is increased leftward and rightward, respectively.

11. The vehicle lamp of claim 1, wherein a forward or backward displacement amount of each of the left end portion and the right end portion of the front edge from the meridional image surface is set as a predetermined value.

* * * * *